United States Patent
Zehavi et al.

(10) Patent No.: US 11,567,888 B2
(45) Date of Patent: Jan. 31, 2023

(54) HIGH BIT RATE COMMUNICATION INTERFACE WITH COMMON MODE VOLTAGE ADJUSTMENT

(71) Applicant: Western Digital Technologies, Inc., San Jose, CA (US)

(72) Inventors: Mordekhay Zehavi, Raanana (IL); Or Faerman, Kibbutz Yifat (IL); Mahmud Asfur, Bat-Yam (IL); Israel Yehiel Zimmerman, Ashdod (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/362,060

(22) Filed: Jun. 29, 2021

(65) Prior Publication Data
US 2022/0414041 A1 Dec. 29, 2022

(51) Int. Cl.
*G06F 13/38* (2006.01)
*G06F 13/16* (2006.01)

(52) U.S. Cl.
CPC ........ *G06F 13/382* (2013.01); *G06F 13/1668* (2013.01)

(58) Field of Classification Search
None
See application file for complete search history.

(56) References Cited

U.S. PATENT DOCUMENTS

| | | | | |
|---|---|---|---|---|
| 5,072,200 A * | 12/1991 | Ranky | ............... | H03H 11/1217 333/167 |
| 7,071,780 B2 * | 7/2006 | Van Zanten | ........ | H03F 3/45941 330/9 |
| 7,221,220 B2 * | 5/2007 | Stein | ........................ | H03F 3/68 330/126 |
| 8,798,204 B2 | 8/2014 | Chen et al. | | |
| 9,024,654 B2 * | 5/2015 | Thelen | ................ | H04L 25/0276 326/82 |
| 2002/0109552 A1 * | 8/2002 | Tran | ........................ | H03L 7/091 331/36 C |
| 2019/0385057 A1 * | 12/2019 | Litichever | ............... | H04L 63/14 |
| 2020/0153395 A1 | 5/2020 | Geng et al. | | |
| 2020/0212943 A1 * | 7/2020 | Banin | ................... | H04L 1/1607 |

FOREIGN PATENT DOCUMENTS

KR 101478037 B1 1/2015

* cited by examiner

*Primary Examiner* — Michael Sun
(74) *Attorney, Agent, or Firm* — Loza & Loza, LLP; Gabriel Fitch (57) ABSTRACT

Various apparatuses, systems, methods, and media are disclosed to provide wired communication interface with common mode voltage adjustment for high bit rate communication between devices. In one example, a high speed data communication interface can split the input signal into a high frequency component and a low frequency component. The high speed data communication interface can adjust the common mode voltage using the low frequency component and combine the high frequency component and the low frequency component by superposition after adjusting the common mode voltage.

20 Claims, 6 Drawing Sheets

HIGH BIT RATE COMMUNICATION INTERFACE WITH COMMON MODE VOLTAGE ADJUSTMENT

FIELD

The disclosure relates, in some aspects, to a data communication interface between two devices for wired communication. More specifically, but not exclusively, the disclosure relates to a wired communication interface with common mode voltage adjustment for high bit rate communication between devices.

INTRODUCTION

Solid state devices (SSDs) incorporating non-volatile memories (NVMs), such as flash NAND memories, are replacing or supplementing conventional rotating hard disk drives for mass storage in many consumer or industrial electronics and computers. One exemplary SSD is a flash drive, which could be, for example, an embedded flash drive. A host device may communicate with a flash drive through a Universal Flash Storage (UFS) interface. The UFS interface can provide high speed data transfer and reliable communication to the flash memory storage in a flash drive. A communication interface circuit can be used between a first UFS device and a second UFS device that communicate with each other using UFS signaling. In some examples, the transmitter and the receiver can have different common mode voltage requirements.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One aspect of the disclosure provides a data communication apparatus. The apparatus includes an input terminal configured to receive a signal at a first common mode voltage from a first device. The apparatus includes an output terminal configured to transmit the signal at a second common mode voltage to a second device. The apparatus further includes a passive circuit coupled between the input terminal and the output terminal, and the passive circuit is configured to pass a first frequency component of the signal to the output terminal. The apparatus further includes an active circuit configured to pass a second frequency component of the signal to the output terminal at the second common mode voltage different from the first common mode voltage. In some aspects, the first frequency component has a higher average frequency than that of the second frequency component.

Another aspect of the disclosure provides a method of data communication. The method includes receiving an input signal at a first common mode voltage from a first device. The method includes filtering the input signal using a passive circuit to pass a first frequency component of the input signal. The method includes filtering the input signal using an active circuit to pass a second frequency component of the input signal. The method includes changing a common mode voltage of the second frequency component from the first common mode voltage to a second common mode voltage. The method further includes generating an output signal by combining the first frequency component and the second frequency component at the second common mode voltage. The method includes transmitting the output signal to a second device that is different from the first device.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

A more particular description is included below with reference to specific aspects illustrated in the appended drawings. Understanding that these drawings depict only certain aspects of the disclosure and are not therefore to be considered to be limiting of its scope, the disclosure is described and explained with additional specificity and detail through the use of the accompanying drawings, in which.

DETAILED DESCRIPTION

In the following detailed description, reference is made to the accompanying drawings, which form a part thereof. In addition to the illustrative aspects, aspects, and features described above, further aspects, aspects, and features will become apparent by reference to the drawings and the following detailed description. The description of elements in each figure may refer to elements of proceeding figures.

Like numbers may refer to like elements in the figures, including alternate aspects of like elements.

The disclosure relates in some aspects to various apparatuses, systems, methods, and media for providing a high speed data serial communication interface with common mode voltage adjustment. In some aspects, the high speed data communication interface can be used to enable two devices with different common mode voltages to communicate using high frequency signals, for example, 12 gigahertz (GHz) or higher, for serial communication. In one example, the high speed data serial communication interface can split the input signal into a high frequency component and a low frequency component. The high speed data communication interface can adjust the common mode voltage using the low frequency component and combine the high frequency component and the low frequency component by superposition after adjusting the common mode voltage.

For purposes of illustration, various aspects of the disclosure will be described in the context of a flash storage that includes NAND memory technology. A NAND device may be referred to herein as a NAND Flash memory, a NAND memory device, a NAND flash, or a NAND. Generally speaking, a NAND device is a non-volatile memory having high storage density, fast access time, low power requirements in operation and advantageous shock resistance, compared to more conventional memory platforms. Raw NAND devices may be equipped (e.g., configured) with a serial interface such as Open NAND Flash Interface (ONFi), Common Flash Memory Interface (CFI), Universal Flash Storage (UFS), and the like. NAND devices may be configured as discrete memory chips or packaged with a controller to form a flash storage device, for example, a secure digital (SD) memory card, Multi Media Card (MMC), or a flash drive. A NAND device may be configured with a single flash die or a plurality of dies. In addition to memory cells, a NAND device may include other components, such as control/address logic components, I/O components, and data register components. It should be appreciated that the teachings herein are also applicable to other forms of memory (e.g., NVM other than NAND devices).

Two devices (e.g., a host and a flash drive) can communicate with each other using a high speed serial data interface such as UFS or the like. In some cases, the devices may work at different common mode voltages. Because the devices operate at the different common mode voltages, the devices may not be able communicate through direct connectivity even when the same communication protocol (e.g., UFS) is used by both devices. In some examples, an intermediate interface device can be used between a first UFS device and a second UFS device to change the common mode voltage level. However, no practical solution is available for an interface device with common mode voltage adjustment that can handle high speed data communication, for example, such as UFS Gear 5 that can operate from DC to 12 gigahertz (GHz). This disclosure relates in some aspects to an apparatus and a method for providing a high speed serial data interface that can adjust the common mode voltage of the output signal, even at particularly high communication speeds (e.g., up to 12 GHz or the like). These aspects and other aspects of the disclosure will now be described in more detail in conjunction with FIGS. 1-7.

Example Solid State Device

Figure 1:
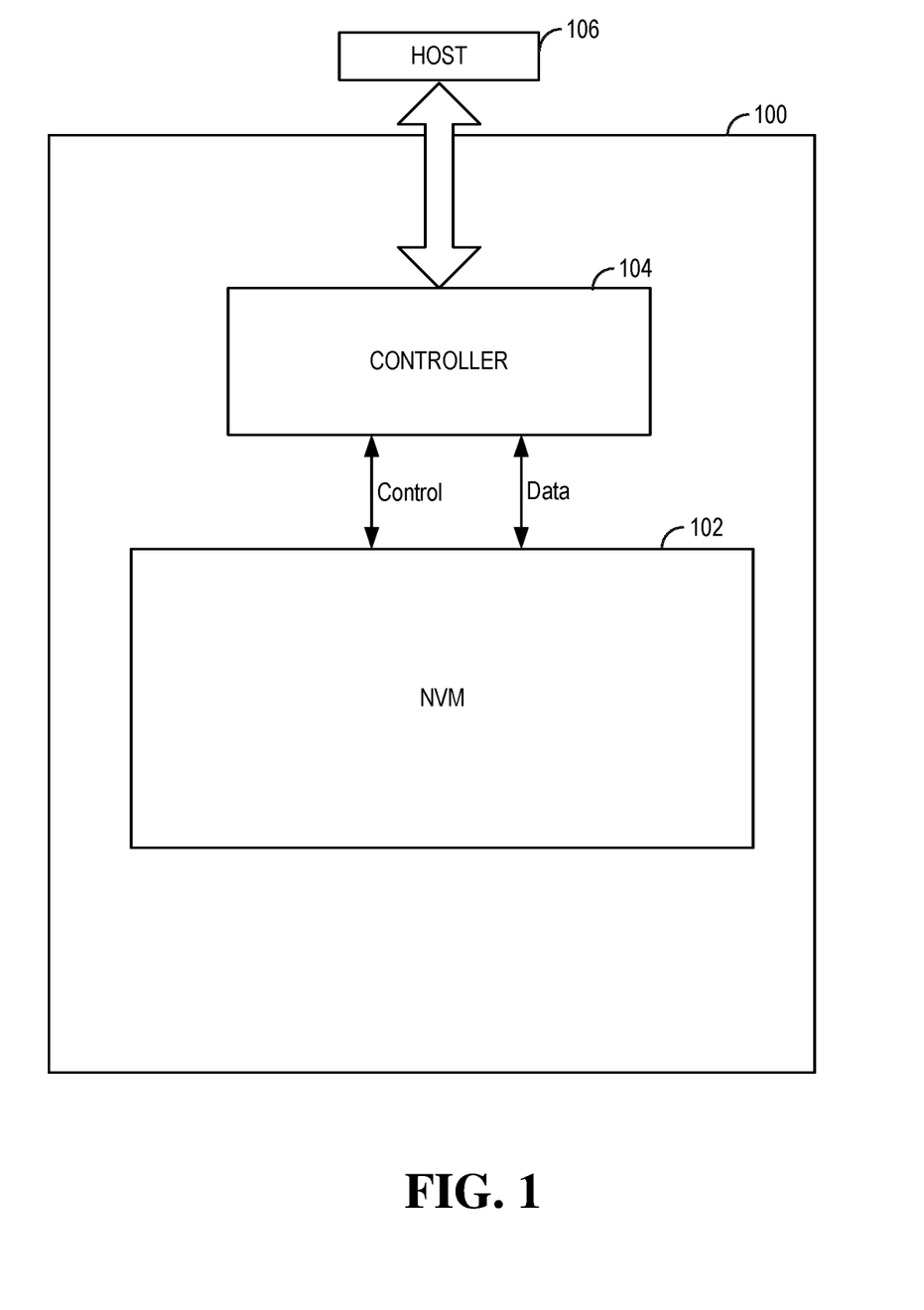
FIG. 1 illustrates an example of solid state device (SSD) in accordance with one or more aspects of the disclosure.

FIG. 1 illustrates an aspect of a solid state device (SSD) 100 that includes a non-volatile memory (NVM) 102 and a controller 104 communicatively coupled to the NVM 102. In one aspect of the disclosure, the NVM 102 may include NAND flash memory or other non-volatile memory. The controller 104 serves as the interface between the NVM 102 and a host 106, which may be connected to a host device's memory interface (e.g., UFS interface). The controller 104 controls various operations of the SSD 100, for example, for storing data to and reading data from the NVM 102. The controller 104 may include any type of processing device, such as a microprocessor, a microcontroller, an embedded controller, a logic circuit, software, firmware, or the like, for controlling operation of the SSD 100. In various aspects, the controller 104 receives commands from the host device 106 and performs the commands to transfer data between the host device 106 and the NVM 102. Each command, therefore, results in the execution/performance of an associated operation (e.g., a read operation, write/program operation, erase operation, etc.). In addition, the controller 104 may perform internal operations such as garbage collection operations, data integrity operations, and wear leveling operations.

The NVM 102 may be made up of one or more non-volatile memory dies (e.g., flash memory dies). As used herein, the term die refers to the set of non-volatile memory cells, and associated circuitry for managing the physical operation of those non-volatile memory cells, that are formed on a single semiconductor substrate. The controller 104 can retrieve data from the NVM 102 and transmit the data to the host device 106. In some examples, the host device may be a computing device, a personal computer, a portable computer, or workstation, a server, a personal digital assistant, a digital camera, a digital phone, or the like. In some aspects of the disclosure, the controller 104 can perform all the typical control operations of the NVM 102 like read, write, erase, format, etc.

The controller 104 can be configured to communicate with the host 106 using different communication protocols. In some aspects of the disclosure, the controller 104 may support various types of communication interfaces, such as an Integrated Drive Electronics (IDE) interface, a Universal Serial Bus (USB) interface, a Serial Peripheral (SP) interface, an Advanced Technology Attachment (ATA) interface, a Small Computer System Interface (SCSI), an IEEE 1394 (Firewire) interface, UFS (e.g., Gear 5 Protocol), or the like. In some aspects, the SSD 100 may include or may be a memory card.

Figure 2:
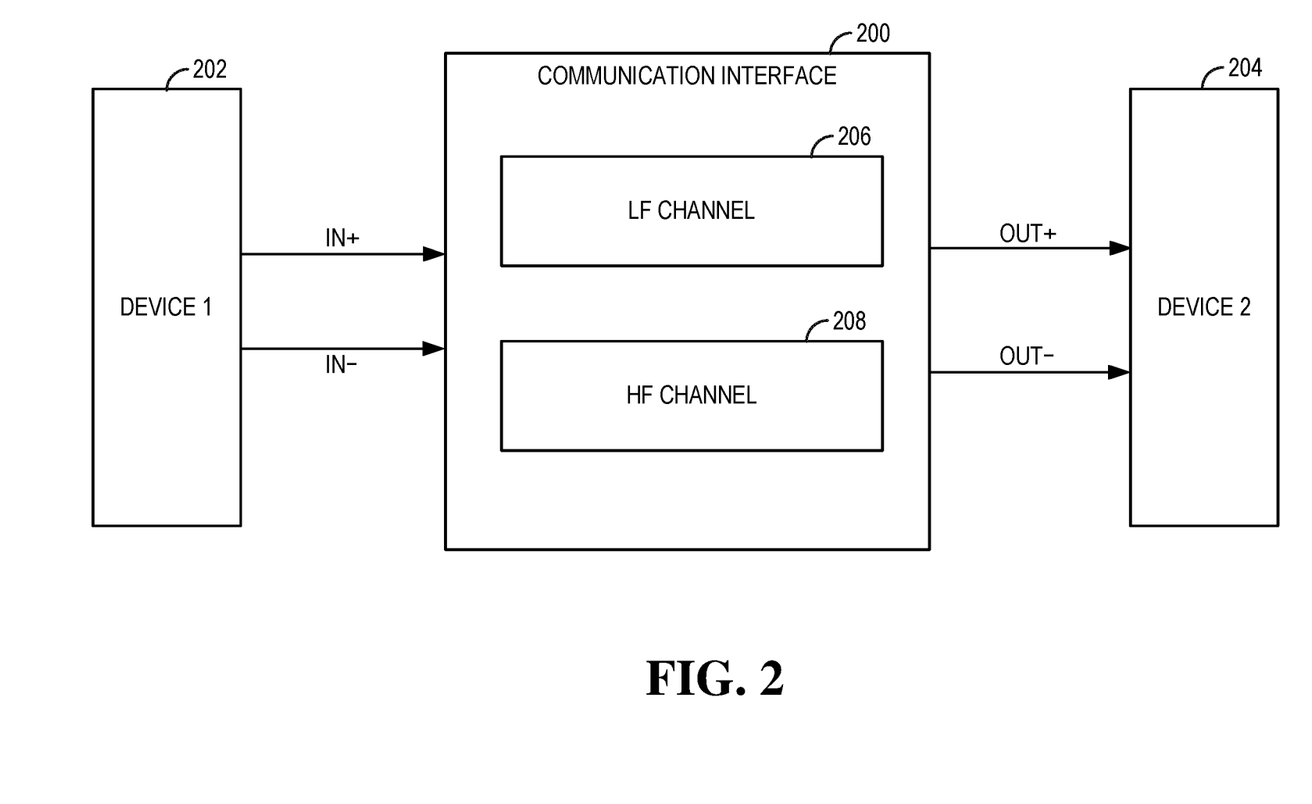
FIG. 2 illustrates a communication interface with common mode voltage adjustment in accordance with one or more aspects of the disclosure.

FIG. 2 is a block diagram illustrating a communication interface 200 for communicatively connecting a first device 202 and a second device 204 according to some aspects of the disclosure. In some examples, the first device 202 may be the host 106, and the second device 204 may be the SSD 100 (e.g., controller 104). In some examples, the first device 202 and the second device 204 may have different common mode voltage requirements for differential signals (e.g., differential communication signals for high speed serial communications). A common mode voltage is a voltage offset (e.g., DC offset) that is common to both the inverting signal (e.g., IN− or OUT−) and non-inverting signal (e.g., IN+ or OUT+) of a differential signal. In some aspects, the communication interface 200 can receive differential input signals (IN+ and IN−) at a first common mode voltage from the first device 202 and transmit differential output signals (OUT+ and OUT−) at a second common mode voltage for the second device 204. The communication interface 200 can be configured to change the common mode voltage at the output. In one aspect, for example, the communication interface 200 can change the common mode voltage (e.g., DC offset) of the output signals without significantly changing the characteristics (e.g., shape) of the differential signals.

In some aspects, the communication interface 200 has a low frequency channel 206 and a high frequency channel 208. The low frequency channel 206 is configured to pass a low frequency component of the input signals (IN+ and IN−) to the outputs (OUT+ and OUT−) and can change a common mode voltage of the output signals to a level operable for the second device 204. In some aspects, the low frequency component may be between DC (0 Hz) and about 50 MHz. In one example, the low frequency component can include pre-communication low speed signals and pulse width modulation used in an UFS interface. The high frequency channel 208 is configured to pass a high frequency component of the input signals to the outputs without the common mode voltage. In some examples, the high frequency component may be between about 50 MHz and about 12 GHz. In one example, the high frequency component can include a frequency range used in UFS Gear 1 up to UFS Gear 5 interface (e.g., 90 MHz to 12 GHz). For example, the high frequency channel 208 can use alternating current (AC) coupling to pass the high frequency component. In some aspects, the high frequency channel 208 can be implemented using a passive circuit without any active circuit components, and the low frequency channel 206 can be implemented using an active circuit using one or more active circuit elements. The term "active circuit," as used herein, refers to a circuit that includes at least one circuit component (e.g., transistors, amplifiers, etc.) that relies on an external power source to control or modify a signal passing through the active circuit (e.g., to control or operate the active circuit or to perform an intended function of the active circuit). The term "passive circuit," as used herein, refers to a circuit that is composed of one or more circuit components (e.g., resistors, capacitors, inductors, etc.) that do not need an external power source to control or modify an electrical signal passing through the passive circuit (e.g., the passive circuit does not need the external power source to perform an intended function of the passive circuit). Stated another way, the passive circuit does not include any active components (e.g., those components that require external power to perform their intended function). In one example, the communication interface 200 can be configured to facilitate communication between the first device 202 and the second device 204 using a high bit rate interface (e.g., UFS Gear 5) at different common mode voltages. In one example, the input signals (IN+, IN−) may have a common mode voltage higher than that of the output signals (Out+, Out−). In another example, the input signals (IN+, IN−) may have a common mode voltage lower than that of the output signals (Out+, Out−).

Figure 3:
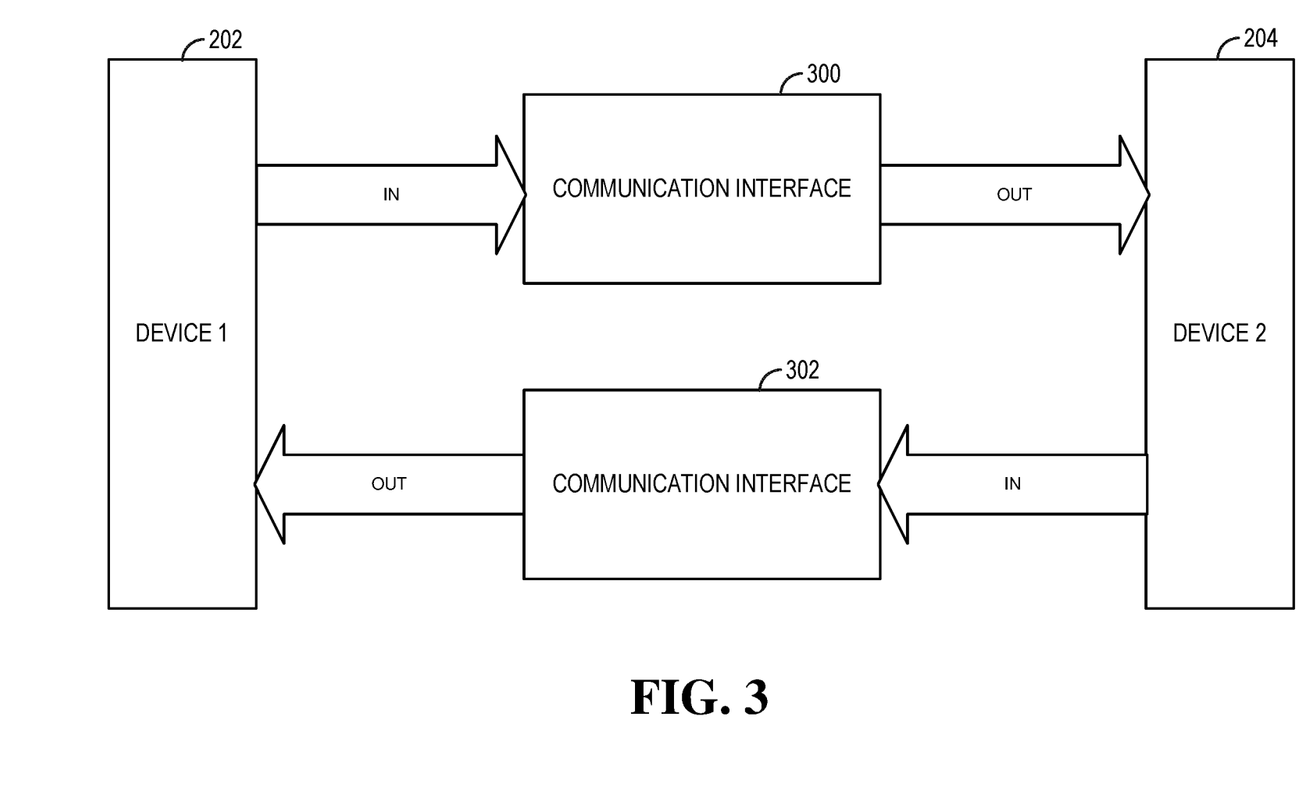
FIG. 3 illustrates examples of the communication interface of FIG. 2 used for bi-directional communication between devices in accordance with one or more aspects of the disclosure.

In one example shown in FIG. 3, two communication interfaces 300 and 302 can be used to support bi-directional or duplex communication between the first device 202 and the second device 204 that work at different common mode voltages. Each of the communication interfaces 300 and 302 can be implemented using the communication interface 200 described above in relation to FIG. 2. In this case, the first communication interface 300 can receive the input signals from the first device 202 and transmit output signals to the second device 204, and the second communication interface 302 can receive the input signals from the second device 204 and transmit output signals to the first device 202.

Example Communication Interface Implementation

Figure 4:
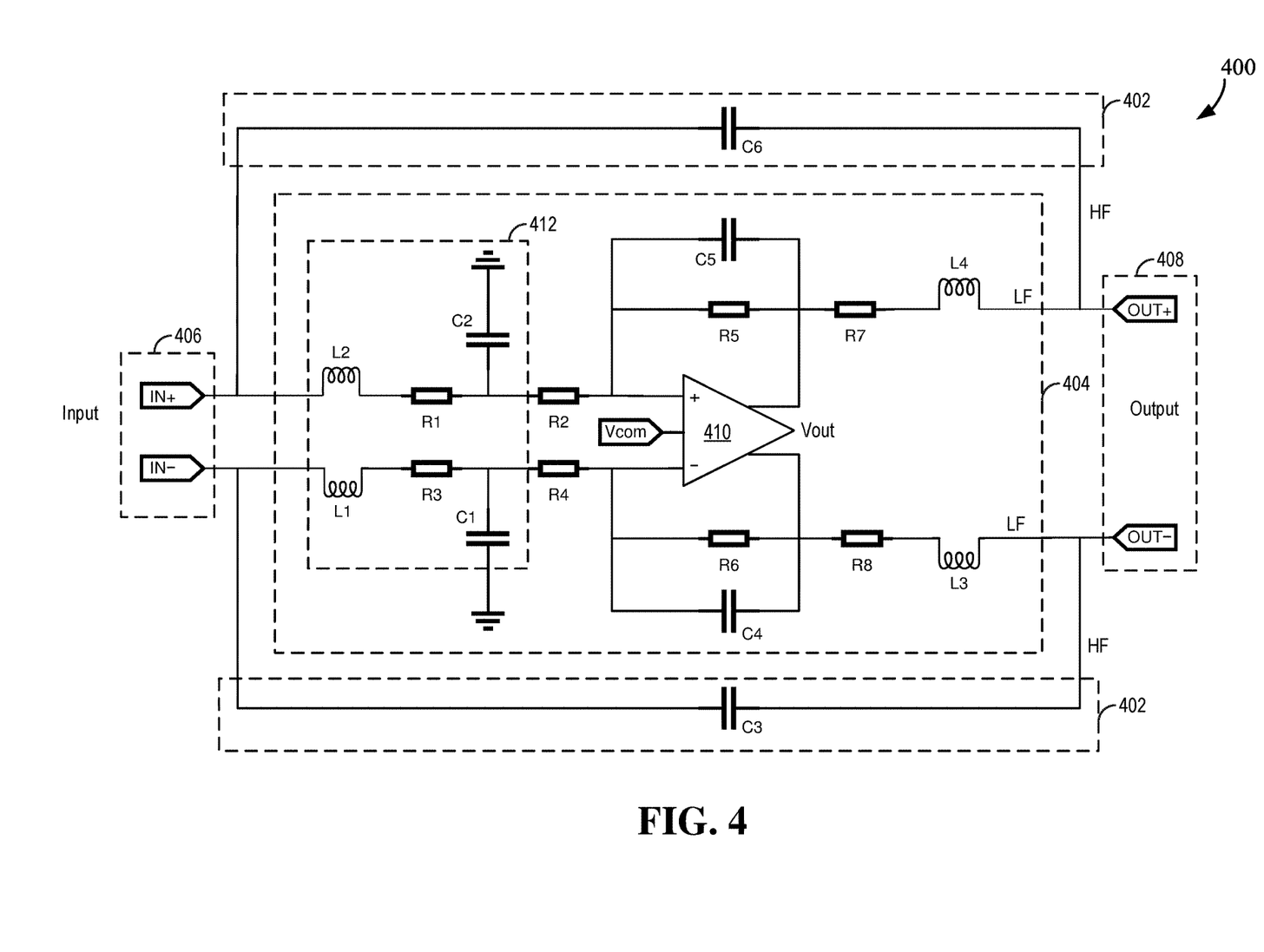
FIG. 4 illustrates an exemplary hardware implementation of the communication interface in accordance with one or more aspects of the disclosure.

FIG. 4 illustrates an exemplary implementation of the communication interface circuit 400 according to some aspects of the disclosure. In some aspects, the communication interface 200 can be implemented using the communication interface circuit 400. The communication interface circuit 400 (a data communication apparatus) can be divided into a high frequency portion (high frequency circuitry) 402 and a low frequency portion (low frequency circuitry) 404 that are connected in parallel between an input 406 (input terminals) and an output 408 (output terminals) of the communication interface. The high frequency portion 402 can correspond to the high frequency channel 208 (see FIG. 2), and the low frequency portion 404 can correspond to the low frequency channel 206 (see FIG. 2). The high frequency portion 402 can be configured to pass a first frequency component (e.g., a signal with a frequency between about 50 MHz and about 12 GHz or higher) of the input signal, and the low frequency portion 404 can be configured to pass a second frequency component (e.g., a signal with a frequency below 50 MHz) of the input signal. In other examples, the first frequency component and the second frequency component can correspond to signals in other frequency ranges. In one aspect, the first frequency component can have an average frequency that is higher than the average frequency of the second frequency component. In one example, the first frequency component may be between about 50 MHz and about 12 GHz or higher. The first frequency component (e.g., HF signal in FIG. 4) and the second frequency component (e.g., LF signal in FIG. 4) are combined at the output 408 by superposition.

In one aspect, the high frequency portion 402 can be implemented without using any active circuit components. For example, the high frequency portion 402 in FIG. 4 includes two capacitors C3 and C6 that are respectively connected between the differential inputs and outputs of the communication interface. For example, capacitor C6 is connected between the non-inverting input (IN+) and the non-inverting output (OUT+), and capacitor C3 is connected between inverting input (IN−) and the inverting output (OUT−). The capacitors C3 and C6 have a capacitance selected to pass the desired first frequency component (e.g., between about 50 MHz and about 12 GHz or higher) and block or substantially reduce the second frequency component that is lower in frequency than the first frequency component.

In one aspect, the low frequency portion 404 is configured to pass the second frequency component (e.g., a frequency below about 50 MHz) and can block or substantially reduce the first frequency component. The low frequency portion 404 may include a low pass filter (LPF) circuit 412 between the input 406 of the communication interface and the input (inverting and non-inverting inputs) of the amplifier 410. The LPF circuit 412 may include separate low pass filters respectively for the complimentary or differential input signals (IN+ and IN−). For example, resistor R1 and capacitor C2 provide low pass filtering for the non-inverting input of the amplifier 410, and resistor R3, and capacitor C1 provide low pass filtering for the inverting input of the amplifier 410. In some aspects, the LPF circuit 412 can further include one or more inductors configured to reduce impact on the high frequency (HF) component at the input sampled point (e.g., inputs of LPF circuit 412).

The low frequency portion 404 may include an active circuit (e.g., amplifier 410) configured to adjust a common mode voltage of its output signal $V_{out}$ such that the common mode voltage at the output 408 of the communication interface can be different from the common mode voltage at the input 406 of the communication interface. In some aspects, the amplifier 410 may be an operational amplifier, a differential amplifier, or the like. In some examples, the amplifier 410 may be implemented with an integrated circuit chip that is not part of the first device 202 and second device 204. In some examples, the amplifier 410 may be included in a PHY interface. In some aspects, the gain of the amplifier 410 can be controlled with a gain control circuit. For example, the gain control circuit may include resistors R2, R4, R5, and R6 and capacitors C4 and C5 shown in FIG. 4. In other examples, the gain control circuit may have other configurations.

In some aspects, the low frequency portion 404 has input resistors (e.g., R1 and R3) and inductors (e.g., L1 and L2) in the sampling path, and resistors (e.g., R7 and R8) and inductors (e.g., L3 and L4) in an output path that is combined with superposition with the high frequency (HF) component. These inductors and resistors can reduce the impact of the low frequency (LF) component on the HF component going through the high frequency portion 402 (HF channel). For example, R1 and R3 together with L1 and L2 can reduce the impact (e.g., signal loss) on the sampling signal at the input 406 of the low frequency portion 404. Furthermore, R1 and R3 with C1 and C2 can be configured to pass low frequency signal (e.g., frequencies below about 50 MHz) to the amplifier 410. Without the resistors and inductors, the low input/output impedance (e.g., 10Ω) of the amplifier 410 can significantly degrade the HF component routed through the high frequency portion 402. While using inductors (e.g., L1 to L4) without resistors can reduce the impact of the LF component on the HF component, using inductors alone is effective mostly at the high frequency area (e.g., about 12 GHz or higher) while the low frequency portion 404 can still have noticeable impact on the relative lower frequency area (e.g., 90 MHz) of the high frequency portion 402. Therefore, in some aspects, the low frequency portion 404 uses both inductors (e.g., L1 to L4) and resistors (e.g., R1, R3, R7, and R8) to reduce the total impact on the HF component (e.g., signal loss thereto) routed through the high frequency portion 402. In general, higher resistor values can better reduce the impact of the LF portion 404 on the HF component. To compensate for the signal loss caused by the resistors (e.g., R1, R3, R7, R8), the amplifier 410 can be configured to generate a higher signal amplitude (including higher common mode voltage) or gain to compensate for the resistor loss such that the impact to the HF component can be reduced. However, the values of R7 and R8 may be limited by the maximum output amplitude or gain of the amplifier 410.

Communication Interface Operations

In reference to FIG. 4, a differential input signal (IN+ and IN−) can be separated into a high frequency component using the high frequency portion 402 and a low frequency component using the low frequency portion 404. For example, the capacitors C3 and C6 can pass a high frequency component of the input signal with minimum impact on signal shape and phase. The capacitors C3 and C6 can remove the DC voltage offset or common mode voltage from the input signal. In one example, the differential input signal may be UFS communication, and the high frequency component may correspond to signaling use for high bit rate communication.

The low frequency portion 404 can pass a low frequency component of the input signal to the differential amplifier 410 where the common mode voltage can be adjusted. For example, inductors L1 and L2 together with the low pass filters 412 can block or significantly reduce the high frequency component of the input signal. The differential amplifier 410 can be configured with a suitable gain to amplify the low frequency component of the input signal such that the output signal (OUT+ and OUT−) of the communication interface (after the attenuation caused by R7 and R8) can maintain a shape substantially the same as the input signal. For example, the gain of the amplifier 410 can be controlled by the gain feedback circuit including capacitors C4 and C5, and resistors R2, R4, R5, and R6. In some aspects, the low frequency component of the input signal can include the DC voltage offset and low bit rate signaling (e.g., Hibernate, Diff_n, and Prepare signals used in UFS communication). The amplifier 410 can adjust the common mode voltage of the output signal in response to a control signal (e.g., Vcom in FIG. 4). For example, when the input signal has a first common mode voltage that is not compatible with second device 204, the amplifier 410 can set the common mode voltage level after the attenuation of R7 and R8 such that the common mode voltage of the output signal will match the common mode voltage used by the second device 204.

The high frequency component (HF in FIG. 4) and the low frequency component (LF in FIG. 4) can be combined by superposition at the output 408 of the communication interface. If the common mode voltage of the low frequency component is adjusted by the low frequency portion 404, the output signal can have a common mode voltage that is different from the input signal. The gains of the high frequency portion 402 and the low frequency portion 404 can be matched such that the output signal has substantially the same signal shape as the input signal across a wide frequency bandwidth (e.g., DC to 36 GHz). In one example, the low frequency portion 404 (e.g., LPF circuit 412) can have a high −3 dB point that matches the low −3 dB point of the high frequency portion 402.

Figure 5:
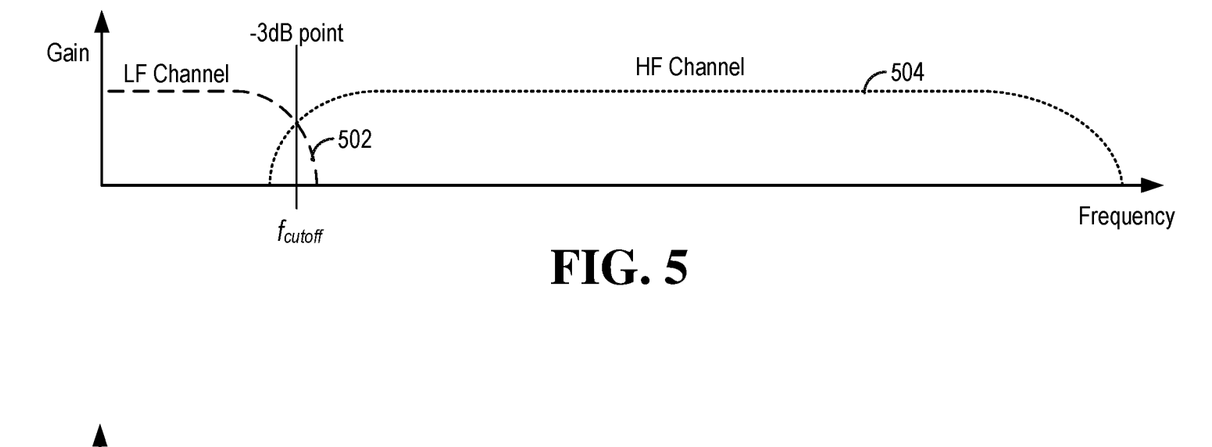
FIGS. 5 and 6 are drawing illustrating the frequency responses of the communication interface in accordance with one or more aspects of the disclosure.

FIG. 5 is a drawing illustrating the frequency responses of the high frequency portion 402 and the low frequency portion 404 across a frequency range in accordance with one aspect of the disclosure. In one example, the frequency response 502 of the low frequency portion has a −3 dB cutoff frequency $f_{cutoff}$ (roll off frequency) that is designed to match the −3 dB cutoff frequency at the lower end of the frequency response 504 of the high frequency portion. That is at the cutoff frequency $f_{cutoff}$, the high frequency portion and the low frequency portion have about the same signal gain. The high end −3 dB cutoff frequency of the low frequency portion can be determined by the LPF circuit 412 (e.g., values of L1, L2, R1, R3, C1, and C2) can attenuate or block the desired high frequency signal. The low end −3 dB cutoff frequency of the high frequency portion can be determined by the values of the capacitors C3 and C6. By selecting suitable values of the resistors, capacitors, and inductors used in the high frequency portion 402 and the low frequency portion 404, the high end −3 dB cutoff frequency of the low frequency portion can be about the same as the low end −3 dB cutoff frequency of the high frequency portion. The low frequency portion 404 (e.g., differential amplifier 410) can amplify the low-passed input signal to a specific or predetermined level to provide the same gain as the high frequency portion 402 at the output 408 of the communication interface. Furthermore, the desired data communication rate (e.g., baud rate) can be determined by selecting suitable values of the capacitors, inductors (e.g., L1 to L4), and resistors (e.g., R1 to R8). In one example, L1, L2, L3, L4 may be 0.1 microHenry (μH), R1 and R3 may be about 800 ohm (Ω), C1 and C2 may be 5 nanofarad (nF), R2 and R4 may be 1 kΩ, R5 and R6 may be 7 kΩ, C4 and C5 may be 7 pF, R7 and R8 may be 367Ω, and C3 and C6 may be 0.1 uF.

Figure 6:
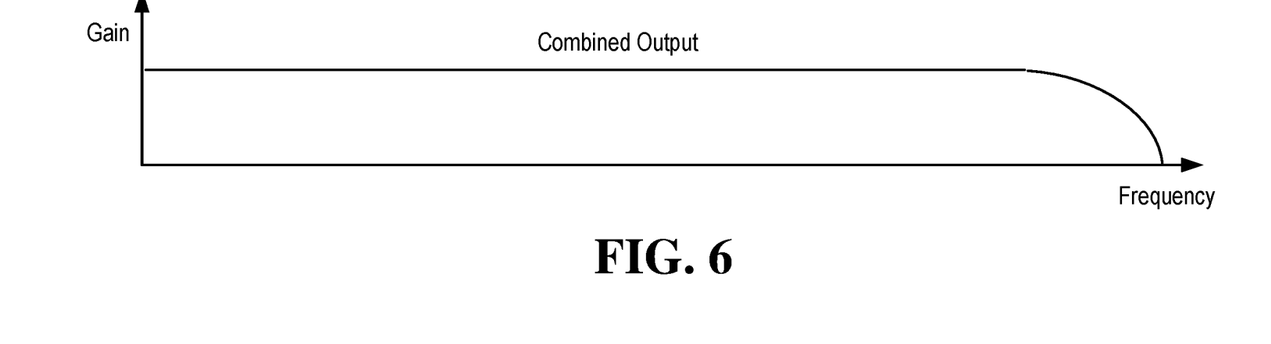

FIG. 6 is a drawing illustrating the combined frequency response of the communication interface at the output where the high frequency component and low frequency component are combined. The combined high frequency and low frequency components has a frequency response that can preserve the signal shape of the input signal at the output of the communication interface with a different common mode voltage.

Figure 7:
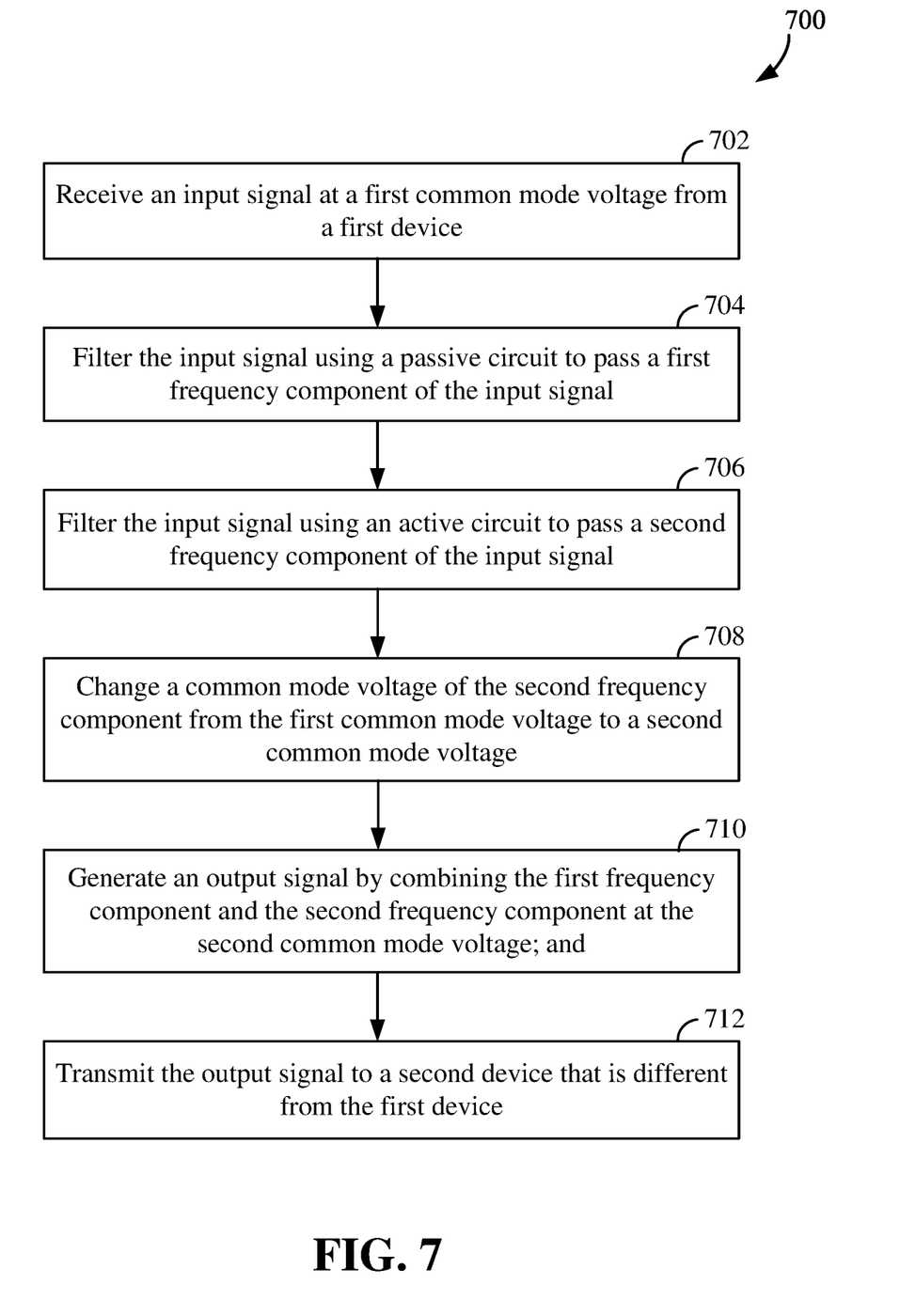
FIG. 7 illustrates an exemplary procedure for adjusting a common mode voltage of data communication in accordance with one or more aspects of the disclosure.

FIG. 7 is a flow chart illustrating a procedure 700 for adjusting a common mode voltage of a differential signal according to some aspects of the disclosure. In some examples, the procedure 700 may be performed using the communication interface described above in relation to FIGS. 2-4. At block 702, a communication interface 200 can receive an input signal at a first common mode voltage from a first device 202. In one example, the input signal may be a differential signal received at the input 406 of the communication interface 200. In one aspect, the input signal may have a bandwidth from DC to 36 GHz. In one example, the input signal may be a UFS communication signal between a host 106 and a SSD 100.

At block 704, the communication interface can filter the input signal using a passive circuit to pass a first frequency component of the input signal. In one example, the high frequency portion 402 can provide a means for passing the first frequency component (e.g., 12 GHz or higher). In one example, capacitors C3 and C6 of the high frequency portion 402 can have a capacitance designed for blocking or attenuating frequencies below the first frequency component. In one example, the capacitors C3 and C6 block the DC component or common mode voltage of the input signal.

At block 706, the communication interface can filter the input signal using an active circuit to pass a second frequency component of the input signal. In one example, the low frequency portion 404 can provides a means for passing the second frequency component (e.g., below 12 GHz). For example, the low frequency portion 404 includes the LPF circuit 412 that can block or attenuate frequencies higher than the second frequency component, and the amplifier 410 can pass the second frequency component to the output. Further, the low frequency portion 404 can include inductors L1, L2, L3, and L4 that can block or attenuate frequencies higher than the second frequency component.

At block 708, the communication interface can change a common mode voltage of the second frequency component from the first common mode voltage to a second common mode voltage. For example, the amplifier 410 can provide a means for changing the common mode voltage of the second frequency component in response to a control signal (e.g., Vcom). The second common mode voltage can be higher or lower than the first common mode voltage.

At block 710, the communication interface can generate an output signal by combining the first frequency component and the second frequency component at the second common mode voltage. For example, the communicate interface 200 can combine the first frequency component (e.g., HF) and the second frequency component (e.g., LF) at the output 408 of the communication interface by superposition.

At block 712, the communication interface can transmit the output signal to a second device that is different from the first device. For example, the first device may be the device 202, and the second device may be the device 204 described above in reference to FIGS. 2-4. In one example, the first device may be the host 108, and the second device may be the SSD 100.

In one aspect, the first frequency component has a higher average frequency than that of the second frequency component. In one aspect, the communication circuit can filter the input signal using a passive high pass circuit (e.g., high frequency portion 402) to pass the first frequency component. In one aspect, the communicate interface can combine the first frequency component and the second frequency component by superposition at an input of the second device. In one aspect, the communication interface can amplify the second frequency component to match a gain of the first frequency component with a gain of the second frequency component. In one aspect, the communication interface can attenuate, using at least one inductor, the first frequency component received by an active circuit configured to amplify the second frequency component. In one aspect, the communication interface can control a first gain of the first frequency component to be the same as a second gain of the second frequency component.

Additional Aspects

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatuses, systems, and computer program products according to aspects of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer-readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding aspects. For instance, an arrow may indicate a waiting or monitoring period of unspecified duration between enumerated steps of the depicted aspect.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example aspects. The example systems and components described herein may be configured differently than described. For example, elements may be added to, removed from, or rearranged compared to the disclosed example aspects.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific aspects of the invention, these should not be construed as limitations on the scope of the invention, but rather as examples of specific aspects thereof. Accordingly, the scope of the invention should be determined not by the aspects illustrated, but by the appended claims and their equivalents. Moreover, reference throughout this specification to "one aspect," "an aspect," or similar language means that a particular feature, structure, or characteristic described in connection with the aspect is included in at least one aspect of the present disclosure. Thus, appearances of the phrases "in one aspect," "in an aspect," and similar language throughout this specification may, but do not necessarily, all refer to the same aspect, but mean "one or more but not all aspects" unless expressly specified otherwise.

The terminology used herein is for the purpose of describing particular embodiments only and is not intended to be limiting of the embodiments. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," an variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data communication apparatus comprising:
an input terminal configured to receive a signal at a first common mode voltage from a first device;
an output terminal configured to transmit the signal at a second common mode voltage to a second device;
a passive circuit coupled between the input terminal and the output terminal, configured to pass a first frequency component of the signal to the output terminal; and
an active circuit coupled between the input terminal and the output terminal, configured to pass a second frequency component of the signal to the output terminal at the second common mode voltage different from the first common mode voltage,
wherein the first frequency component has a higher average frequency than that of the second frequency component.

2. The data communication apparatus of claim 1, wherein the passive circuit comprises at least one capacitor configured to pass the first frequency component of the signal from the input terminal to the output terminal.

3. The data communication apparatus of claim 2, wherein the passive circuit comprises no discrete inductive component.

4. The data communication apparatus of claim 1, wherein the first frequency component and the second frequency component are combined at the output terminal by superposition.

5. The data communication apparatus of claim 1, wherein the active circuit comprises an amplifier configured to:
 receive the second frequency component of the signal at the first common mode voltage; and
 output the second frequency component of the signal at the second common mode voltage.

6. The data communication apparatus of claim 5, wherein the amplifier comprises:
 a differential amplifier configured to amplify the second frequency component of the signal;
 a low pass filter (LPF) coupled between the input terminal and an input of the differential amplifier; and
 a feedback circuit between the input of the differential amplifier and an output of the differential amplifier.

7. The data communication apparatus of claim 5, wherein the amplifier is configured to match a gain of the second frequency component of the signal with a gain of the first frequency component at the output terminal.

8. The data communication apparatus of claim 5, wherein the active circuit further comprises a low pass filter (LPF) coupled to an input of the amplifier, the LPF configured to pass the second frequency component of the signal to the amplifier.

9. The data communication apparatus of claim 8, wherein the active circuit further comprises at least one inductor configured to attenuate the first frequency component of the signal received by the active circuit.

10. The data communication apparatus of claim 9, wherein the at least one inductor comprises:
 at least one first inductor coupled between the input terminal and the LPF; and
 at least one second inductor coupled between an output of the amplifier and the output terminal.

11. The data communication apparatus of claim 1, wherein:
 the active circuit is configured to provide a first gain at a frequency below a cutoff frequency and a second gain at the cutoff frequency; and
 the passive circuit is configured to provide a third gain above the cutoff frequency and a fourth gain at the cutoff frequency,
 wherein a combined gain of the second gain and the fourth gain is equal to the first gain or the third gain.

12. The data communication apparatus of claim 1, wherein at least one of the first device or the second device comprises a data storage device comprising a non-volatile memory.

13. A data storage device comprising the data communication apparatus of claim 1.

14. A host comprising the data communication apparatus of claim 1.

15. A method of data communication comprising:
 receiving an input signal at a first common mode voltage from a first device;
 filtering the input signal using a passive circuit to pass a first frequency component of the input signal;
 filtering the input signal using an active circuit to pass a second frequency component of the input signal, wherein the first frequency component has a higher average frequency than that of the second frequency component;
 changing a common mode voltage of the second frequency component from the first common mode voltage to a second common mode voltage;
 generating an output signal by combining the first frequency component and the second frequency component at the second common mode voltage; and
 transmitting the output signal to a second device that is different from the first device.

16. The method of claim 15, wherein the filtering the input signal to pass the first frequency component comprises:
 filtering the input signal using a passive high pass circuit to pass the first frequency component.

17. The method of claim 15, wherein the combining comprises:
 combining the first frequency component and the second frequency component by superposition at an input of the second device.

18. The method of claim 15, further comprising:
 amplifying the second frequency component to match a gain of the first frequency component with a gain of the second frequency component.

19. The method of claim 18, further comprising:
 attenuating, using at least one inductor, the first frequency component received by an active circuit configured to amplify the second frequency component.

20. The method of claim 15, further comprising:
 controlling a first gain of the first frequency component to be the same as a second gain of the second frequency component.

* * * * *